United States Patent
Ludwig et al.

(10) Patent No.: US 10,284,024 B2
(45) Date of Patent: May 7, 2019

(54) DEVICE AND METHOD FOR THE DETECTION OF AN INTERFERING BODY IN A SYSTEM FOR THE INDUCTIVE TRANSFER OF ENERGY AND A SYSTEM FOR THE INDUCTIVE TRANSFER OF ENERGY

(71) Applicant: Bombardier Primove GmbH, Berlin (DE)

(72) Inventors: Christoph Ludwig, Constance (DE); Adrianus Johannes Steinfort, Kreuzlingen (CH); Wolfgang Ludwig, Tagerwilen (CH)

(73) Assignee: Bombardier Primove GmbH, Berlin (DE)

(*) Notice: Subject to any disclaimer, the term of this patent is extended or adjusted under 35 U.S.C. 154(b) by 125 days.

(21) Appl. No.: 15/304,231

(22) PCT Filed: Mar. 31, 2015

(86) PCT No.: PCT/EP2015/056953
§ 371 (c)(1),
(2) Date: Oct. 14, 2016

(87) PCT Pub. No.: WO2015/158540
PCT Pub. Date: Oct. 22, 2015

(65) Prior Publication Data
US 2017/0033616 A1    Feb. 2, 2017

(30) Foreign Application Priority Data
Apr. 17, 2014   (DE) .................. 10 2014 207 427

(51) Int. Cl.
*H02J 50/60* (2016.01)
*H01F 27/42* (2006.01)
(Continued)

(52) U.S. Cl.
CPC ............ *H02J 50/60* (2016.02); *B60L 11/182* (2013.01); *H01F 27/2804* (2013.01);
(Continued)

(58) Field of Classification Search
CPC .. H02J 50/10; H02J 50/40; H02J 50/60; H02J 50/50; H02J 50/90; H02J 7/025;
(Continued)

(56) References Cited

U.S. PATENT DOCUMENTS 5,049,763 A * 9/1991 Rogers ............. H03K 19/00361
326/15
6,650,227 B1 * 11/2003 Bradin ................. G06K 7/0008
340/10.1
(Continued)

FOREIGN PATENT DOCUMENTS

DE    102009033237 A1    1/2011
DE    102012205283 A1    10/2013
(Continued)

*Primary Examiner* — Fritz M Fleming
*Assistant Examiner* — Jagdeep S Dhillon
(74) *Attorney, Agent, or Firm* — The Webb Law Firm

(57) ABSTRACT

The invention relates to a method and an apparatus for detecting at least one interfering body in a system for inductive energy transmission, wherein the system includes at least one primary coil unit, wherein the apparatus includes at least one interfering body detector means, wherein the at least one interfering body detector means includes at least one field coil means and at least one detector coil means which is assigned to the at least one field coil means, wherein the apparatus includes at least one evaluation means, wherein the interfering body is detectable depending on the state of coupling and/or the change in the state of coupling, wherein the apparatus includes at least one compensation means.

19 Claims, 3 Drawing Sheets

(51) Int. Cl.
  *H01F 37/00* (2006.01)
  *H01F 38/00* (2006.01)
  *B60L 11/18* (2006.01)
  *H02J 7/02* (2016.01)
  *H02J 50/10* (2016.01)
  *H01F 27/28* (2006.01)
  *H01F 38/14* (2006.01)

(52) U.S. Cl.
  CPC .............. *H01F 38/14* (2013.01); *H02J 7/025* (2013.01); *H02J 50/10* (2016.02); *Y02T 10/7005* (2013.01); *Y02T 10/7072* (2013.01); *Y02T 90/122* (2013.01); *Y02T 90/14* (2013.01)

(58) Field of Classification Search
  CPC .. H02J 5/00; H02J 5/005; H01F 38/14; G01V 3/11; H04Q 5/22
  USPC ........... 307/104, 149, 66, 64, 80, 82, 43, 45; 324/329; 340/10.3
  See application file for complete search history.

(56) References Cited

U.S. PATENT DOCUMENTS

| | | | |
|---|---|---|---|
| 8,406,823 B2* | 3/2013 | Kondo | H02J 7/025 455/573 |
| 8,766,487 B2 | 7/2014 | Dibben et al. | |
| 8,772,973 B2* | 7/2014 | Kurs | H02J 5/005 307/104 |
| 8,963,488 B2* | 2/2015 | Campanella | H02J 5/005 320/108 |
| 9,160,203 B2* | 10/2015 | Fiorello | H03H 7/40 |
| 9,442,172 B2 | 9/2016 | Verghese et al. | |
| 2007/0228833 A1* | 10/2007 | Stevens | H02J 5/005 307/45 |
| 2009/0026266 A1 | 1/2009 | Raggam | |
| 2009/0295391 A1* | 12/2009 | Bosnar | G01V 11/00 324/329 |
| 2010/0181843 A1* | 7/2010 | Schatz | B60L 11/007 307/104 |
| 2011/0025133 A1* | 2/2011 | Sauerlaender | H02J 5/005 307/104 |
| 2011/0074346 A1 | 3/2011 | Hall et al. | |
| 2012/0001493 A1 | 1/2012 | Kudo et al. | |
| 2012/0049850 A1 | 3/2012 | Reime | |
| 2012/0146580 A1 | 6/2012 | Kitamura | |
| 2012/0181875 A1 | 7/2012 | Wechlin et al. | |
| 2012/0242160 A1* | 9/2012 | Tseng | H04B 5/0037 307/104 |
| 2013/0099592 A1* | 4/2013 | Abe | H02J 5/005 307/104 |
| 2013/0163635 A1 | 6/2013 | Karanth et al. | |
| 2013/0307532 A1 | 11/2013 | Reime | |
| 2014/0084857 A1* | 3/2014 | Liu | H02J 5/005 320/108 |
| 2014/0191715 A1 | 7/2014 | Wechlin et al. | |
| 2014/0239735 A1 | 8/2014 | Abe et al. | |
| 2014/0300350 A1* | 10/2014 | Teppan | G01R 15/185 324/244 |
| 2015/0015086 A1* | 1/2015 | Krammer | B60L 11/182 307/104 |
| 2015/0015199 A1 | 1/2015 | Krammer et al. | |
| 2015/0145530 A1* | 5/2015 | Urano | H01F 27/402 324/655 |
| 2015/0263532 A1* | 9/2015 | Van Wageningen | H02J 5/005 307/104 |
| 2015/0276965 A1 | 10/2015 | Turki | |
| 2015/0321567 A1 | 11/2015 | Czainski | |

FOREIGN PATENT DOCUMENTS

| | | |
|---|---|---|
| EP | 2482294 A1 | 8/2012 |
| GB | 2508923 A | 6/2014 |
| JP | 09098014 A | 8/1997 |
| JP | 10215530 A | 11/1998 |
| JP | 2000295796 A | 10/2000 |
| JP | 2012016125 A | 1/2012 |
| JP | 201275200 A | 4/2012 |
| JP | 2012075200 A | 4/2012 |
| JP | 2012249401 A | 12/2012 |
| KR | 101383731 B1 | 4/2014 |
| WO | 2009081115 A1 | 7/2009 |
| WO | 2010133328 A1 | 11/2010 |
| WO | 2012004092 A2 | 1/2012 |
| WO | 2012047779 A1 | 4/2012 |
| WO | 2012104086 A2 | 8/2012 |
| WO | 2012136303 A2 | 10/2012 |
| WO | 2012160136 A2 | 11/2012 |
| WO | 2013035853 A1 | 3/2013 |
| WO | 2013036947 A2 | 3/2013 |
| WO | 2013189530 A1 | 12/2013 |
| WO | 2014011788 A1 | 1/2014 |
| WO | 2014041176 A2 | 3/2014 |

* cited by examiner

DEVICE AND METHOD FOR THE DETECTION OF AN INTERFERING BODY IN A SYSTEM FOR THE INDUCTIVE TRANSFER OF ENERGY AND A SYSTEM FOR THE INDUCTIVE TRANSFER OF ENERGY

CROSS-REFERENCE TO RELATED APPLICATIONS

This application is the United States national phase of International Application No. PCT/EP2015/056953 filed Mar. 31, 2015, and claims priority to German Patent Application No. 10 2014 207 427.4 filed Apr. 17, 2014, the disclosures of which are hereby incorporated in their entirety by reference.

BACKGROUND OF THE INVENTION

Field of the Invention

The invention relates to a device and a method for the detection of an interfering body in a system for the inductive transfer of energy and a system for the inductive transfer of energy.

Description of Related Art

The inductive transfer of energy from the street side to a vehicle, e.g. for charging vehicle batteries of electrically operated vehicles, is becoming increasingly established as an alternative to providing a plug connection with which stationarily generated and supplied electrical energy is then transferred to an electrically operated vehicle in order to bring about a charging operation of the vehicle energy storage. Such systems generally comprise a primary coil unit which can be arranged on the street side. E.g., the primary coil unit can be integrated in a roadway or in a charging block installed on the roadway. Furthermore, the system comprises a secondary coil unit which is arranged on the vehicle side, in particular on a bottom of a vehicle.

In particular the inductive coupling between a (typically stationary) primary coil unit and a vehicle-side unit in the inductive transfer of energy proves to be advantageous in the practical daily operation and enjoys a correspondingly high acceptance; not only an additional expense for handling and operating in a wire-supported transfer of energy, but also potential transition resistances and mechanical loads (up to possible wear) are acute and potential advantages of the wireless transfer technology based on the inductive coupling of coils.).

Current developments show that above and beyond a car context in which approximately 3 kW or more can typically be inductively transferred, electrical performances of the contactless-inductive transfer of energy are also already accessible which achieve 20 kW or more. Therefore, the door is also open for trucks or vehicles of public transportation, wherein high degrees of efficiency of up to 95% and more are supplementing the acceptance in the transfer of energy.

However, the contactless-inductive transfer of energy in the two-digit kW range requires large coils and correspondingly large active surfaces for the inductive transfer of energy so that there is not only the challenge of placing the vehicle suitably provided with a (receiving-side) coil unit for the inductive coupling above or in electromagnetic engagement with the (stationary) primary coil unit but also the primary coil unit with the active surface associated which is to be protected from environmental influences, errors of use and activation as well as vandalism which can disadvantageously influence the proper operation of the transfer of power.

Such a problem is, for example, the occurrence of metallic or electromagnetically conductive interfering bodies on or electromagnetically actively adjacent to this primary-side active surface. Heat would be generated in the proper activation of the primary coil unit by the induction of eddy currents in an interfering body coupled in such a manner as by making undesired contact or electromagnetically.

This heat can have a disadvantageous effect on the operating safety of the system for the inductive transfer of energy. For example, the interfering body can exhibit an unpredictable movement behavior due to the heat or can represent an undesired heat source for a user upon contact.

Accordingly, various attempts known from the prior art are to be presumed for recognizing such foreign bodies, in particular on the engagement surface or active surface of the primary coil unit for transferring energy to the vehicle in a reliable manner and, for example, to stop either the transfer of energy or, however, to at least initiate an alarm signal as reaction to such a recognition which then initiates an automatic or manual removal of the interfering body.

A solution path that is customary and to be presumed in advance as known consists in detecting a relevant interfering body with the aid of optical means (for example, by otherwise known image detection systems in the visible spectrum, and alternatively, for example, also infrared-optical) in such a manner that a problem-free image is compared with an interfering body state by a suitable evaluation unit for such interfering bodies and upon a corresponding deviation the detection takes place. The simplicity of the devices and data in the evaluation are advantages of such an attempt and at the same time such an image-based detector technology is suited only to a limited extent for universal attempts and for changing environmental conditions since, for example, a difference between relevant (for example metallic) interfering bodies on the one hand and uncritical interfering bodies or artifacts on the other hand is not always simple in image-producing methods. Note, by way of example the loading of an active surface with leaves or such environmental influences in outdoor operation which are in fact irrelevant as regards the inductive transfer of energy but in the case of image-based interfering body detectors would frequently result in alarm states.

An alternative attempt which is also known from the prior art and to be presumed for realizing detector means for interfering bodies is to detect the influence of the (exclusively relevant) metallic or electromagnetically conductive interfering bodies on the field between the primary coil unit and the vehicle-side coil unit, which field is used for the inductive transfer and of energy and is therefore already present and to evaluate this influence as a potential interfering state: in comparison to a non-interfered, coupled operation for the transfer of energy between a primary coil unit and a vehicle-side coil a metallic interfering body would result in an electromagnetic influencing of the field which for its part would be detectable as a deviation of signal upon a detection and evaluation of the coupling state.

However, such an attempt also has disadvantages and potential for improvement: on the one hand a signal-noise interval detection on the basis of a detection and evaluation of changes in the described coupling is usually low partially because a relevant interfering body is typically small as regards its dimensions in comparison to the affected active surface of the primary coil unit. In other words, such a detector technology requires effective minimum sizes of an interfering body in order to make a reliable detection possible and in this connection it must be additionally taken into consideration as a potential disadvantage that not necessarily every alignment of position of an interfering body (comprising a geometric alignment) causes a detector signal in the same manner.

A second disadvantage of the magnetic field detector technology that is known and potentially to be presumed as forming a species for the detection of interfering bodies from a detection of the coupling state (or its change) between a primary coil unit and a vehicle-side coil unit is that in order to detect the interfering body the primary-side coil unit must be activated, that is, for example, it must have current to bring about the inductive operation of energy transfer. However, this is energetically inefficient as regards, for example, an operation outside of a direct coupling to the vehicle; on the other hand, upon an activation of the detection to be presumed as known, the electrical loading with energy would directly initiate an error function, which is actually to be avoided, only upon a concrete, inductive engagement position of the units (and an interfering body already present there).

Therefore, even the using of the coupling between the primary coil unit and the vehicle-side coil unit, which coupling is already present for the inductive transfer of energy, proves to be potentially little suited to ensure a reliable detection of an interfering body on the active surface in an energetically efficient manner and with a high degree of operational safety.

GB 1222712.0 (not yet published) discloses a safety system for a system for the inductive transfer of energy to a vehicle. The safety system comprises an inductive sensor system comprising several detection windings. Furthermore, it is disclosed that the inductive sensor system comprises at least one exciter winding. The safety system serves to detect foreign objects arranged in the vicinity of a primary winding structure of the system for the inductive transfer of energy.

WO2013/189530 A1 describes a detection coil structural unit for the recognition of electrically conductive foreign bodies in the area of an energy transmitting coil, wherein the detection coil structural unit comprises at least one multipole detection coil with at least two windings in opposite directions to each other.

DE 10 2012 205 283 A1 describes a device for the inductive transfer of power which comprises a primary unit with a primary coil and a secondary unit with a secondary coil and in which the primary coil induces a magnetic transfer field in a transfer range between the primary unit and the secondary unit and which comprises an even number of detector coil elements which are oppositely wound in pairs and form a detector pair.

The technical problem is posed of providing a device and a method for the detection of interfering bodies in a system for the inductive transfer of energy which improve a detection, in particular a detection speed, robustness and elevate the reliability of the detection. Furthermore, the technical problem is posed of providing a system for the inductive transfer of energy with an increased operational safety.

SUMMARY OF THE INVENTION

An improved device is to be provided in particular which is easy to handle and evaluate so that a potentially economical series manufacture is made possible and additionally the opportunity is created of re- or retrofitting existing systems in a simple manner.

The solution of the technical problem results from the subject matters with the features of Claims 1, 15 and 16. Other advantageous embodiments of the invention result from the subclaims.

The present invention makes possible the use of the suggested subject matters for very different types of automobiles, also including busses and other electrically operated vehicles, e.g. also rail vehicles even of public transportation as well as for freight transport and military purposes.

A device for the detection of at least one interfering body in a system for the inductive transfer of energy, in particular to a vehicle, is proposed. The interfering body can designate a foreign body here, in particular a metallic and/or electromagnetically conductive interfering body.

The system for the inductive transfer of energy comprises at least one primary coil unit which can also be designated as the primary winding structure in order to generate at least part of an electromagnetic power transfer field.

Furthermore, the system can comprise for the inductive transfer of energy at least one secondary coil unit which can also be designated as a secondary winding structure or vehicle-side coil unit for receiving the electromagnetic field generated by the primary coil unit.

A power transfer field can correspond here to the field generated by the primary coil unit or to a superpositioning of the field generated by the primary coil unit and of a field generated by the secondary coil unit which is generated by a current induced in the secondary coil unit during the reception of the field generated by the primary coil unit.

As is explained in more detail in the following the primary coil unit can be associated with an inductive active surface or an inductive active volume. The primary coil unit can be inductively coupled to the secondary coil unit.

Furthermore, the device comprises at least one means for the detection of interfering bodies wherein the at least one means for the detection of interfering bodies comprises at least one exciter coil means for generating an exciter field and at least one detector coil means which is associated with the at least one exciter coil means. This can mean that the detector coil means is constructed and/or arranged in such a manner that at least a part of the exciter field can be received by the detector coil means. Therefore, the detector coil means can generate, e.g. an output voltage as a function of the received exciter field.

The exciter coil means can be constructed here as an individual coil or can comprise a plurality of individual coils. If the exciter coil means is constructed as an individual coil then the device preferably comprises several such exciter coil means. Even the detector coil means can be constructed here as an individual coil or comprise a plurality of individual coils. If the detector coil means is constructed as an individual coil then the device preferably comprises several such detector coil means.

The means for the detection of interfering bodies can be associated with the primary coil unit. The means for the detection of interfering bodies serves to detect a metallic and/or electromagnetically conductive interfering body, in particular on the active surface or adjacent to its active field or in the active volume or adjacent to the active field of the active volume. Also, the means for the detection of interfering bodies can be associated with the secondary coil unit.

The means for the detection of interfering bodies, in particular the exciter coil means as well as the detector coil means is constructed separately from the primary coil unit and separately from the secondary coil unit. Therefore, the means for the detection of interfering bodies are provided with exciter coil means and with detector coil means associated with the latter which are separate and are therefore provided in addition to and independently of the primary coil unit.

Furthermore, the exciter coil means and the detector coil means can be activated and/or operated independently of an activation state, in particular an inductive transfer operation, of the primary coil unit and/or the secondary coil unit. Therefore, the detection of interfering bodies realized with the exciter coil means and the detector coil means can be activated and operated independently of an inductive transfer of energy operation between the primary coil unit and the vehicle-side coil unit. This means that, for example an operation of the exciter coil means and of the associated detector coil means, which operation is provided solely for the purpose of detecting interfering bodies and therefore potentially has little power, can take place in a continuous manner even outside of a concrete energy transfer (charging) operation of the transfer of power to the vehicle. This then leads positively to the fact that a detection of interfering bodies can take place at practically any time, in order that potentially in particular even before the vehicle has reached its relative position (=charging position) provided for the inductive coupling to the primary coil unit. Accordingly, a potential power activation state that is dangerous or comprises disturbances can be suppressed with the invention so that the operational safety of the inductive operation of the transfer of energy along with previous and subsequent operating states can be significantly improved.

Furthermore, the invention provides at least one evaluation means for detecting a coupling state between the at least one exciter coil means and the at least one detector means and or for detecting a change of this coupling state. E.g., the evaluation means can evaluate at least one property of an output signal of the at least one detector coil means, e.g. an output voltage.

The foreign object can be detected as a function of the coupling state and/or of the change of the coupling state. E.g., the foreign object can be detected as a function of the at least one property of the output signal, in particular of a course in time or a change of the output signal.

Furthermore, the device comprises at least one compensation means for taking into account an electromagnetic influence of the primary coil unit and/or of the secondary coil unit on the coupling state, in particular the electromagnetic or inductive coupling state between the at least one exciter coil means and the at least one detector coil means. Taking into account means here compensating.

This can mean that the influence of the previously explained power transfer field on the coupling state between the at least one exciter coil means and the at least one detector coil means can be determined and/or reduced, in particular completely compensated or eliminated by the compensation means. The at least one compensation means can be part of the means for the detection of interfering bodies. In particular, the at least one compensation means can be made available at least partially by the evaluation means.

The proportion of the power transfer field to the field received by the at least one detector coil means can be reduced, in particular completely compensated or eliminated by the compensation means. Alternatively or cumulatively the proportion of the output signal which is generated by the at least one detector coil means as a function of the received power transfer field can be reduced, in particular completely compensated or eliminated by the compensation means.

Alternatively or cumulatively, the proportion of the power transfer field on the field received by the at least one detector coil means can be determined by the compensation means. Furthermore, the proportion of the output signal which is generated by the at least one detector coil means as a function of the received power transfer field can be determined alternatively or cumulatively.

The fact that the proportion of the power transfer field can be determined or that the proportion of the output signal of the detector coil means, which is generated by the at least one detector coil means as a function of the received power transfer field can be determined can mean that a computer determination of the proportion is taking place. In particular, in this instance the compensation means can comprise the evaluation means or can be constructed as evaluation means for the computer determination.

The fact that the proportion of the power transfer field can be reduced or that the proportion of the output signal of the detector coil means which is generated by the at least one detector coil means as a function of the received power transfer field can be reduced can signify on the one hand that after a computer determination of the proportion, this proportion can be computed from or can be filtered out from the corresponding quantity, e.g., the output signal of the detector coil means. Alternatively, this can mean that the proportion of the power transfer field is reduced before or during the reception by the detector coil means, that is, before the generation of an output signal, in particular by the previously explained active compensation.

It is possible to provide first compensation means for taking account of an electromagnetic influence of the primary coil unit and to provide other compensation means for taking account of an electromagnetic influence of the secondary coil unit on the coupling state between the at least one exciter coil means and at least one detector coil means, wherein the first and the other compensation means are constructed independently of one another.

The invention therefore provides that for the purpose of detecting interfering bodies the separate exciter coil means generates the magnetic field which is then to be detected by the detector coil means without the field generated for the inductive transfer of (power-) energy playing a part here. The present invention advantageously provides compensation means which compensate and/or eliminate a possible electromagnetic influence of this contactless power transmission field on the detection, according to the invention, of the coupling state (or its change) between the exciter coil means and the detector coil means.

If a power transfer field is generated, then the detector coil means also receives the power transfer field, in particular additionally to the exciter field. However, the power transfer field can make a detection difficult, in particular on account of a change of the output signal of the detector coil means. The suggested device therefore makes possible in an advantageous manner a more reliable, more rapid and more robust detection of interfering bodies.

In a preferred embodiment the at least one compensation means comprises at least one compensation coil means, wherein a compensation field can be generated by the compensation coil means, wherein at least a part of the power transfer field received by the at least one detection means can be compensated by the compensation field. The power transfer field received by the at least one detection means can preferably be completely compensated by the compensation field.

The compensation coil means can be constructed here as an individual coil or can comprise a plurality of individual coils. If the compensation coil means is constructed as an individual coil than the device preferably comprises several such compensation coil means.

Can be compensated can signify that the compensation field or at least a part of it is superposed on the power transfer field, wherein the superposing compensation field has an orientation opposite to the superposed power transfer field. An intensity of the superimposing compensation field preferably does not deviate or deviates only maximally by a predetermined extent from the intensity of the superposed power transfer field. The at least one compensation means can be constructed in particular as a compensation coil unit. The compensation coil unit can be arranged and/or constructed in particular in such a manner that at least a part of the power transfer field received by the at least one detection means can be compensated by the compensation field. Also the compensation means can be constructed independently of or separately from the primary coil unit and the secondary coil unit.

For example, both the primary coil unit can be operated in such a manner that a power transfer field is generated. The at least one exciter coil means cannot be operated here so that no exciter field (detection field) is generated. Based on the power transfer field, the at least one detector coil means will generate an output signal. Then, a compensation field can be generated by the at least one compensation means in such a manner that the detector coil means no longer generates an output signal or the output signal is reduced to a desired extent.

The compensation by a field generated by the compensation coil means can also be designated as active compensation.

Alternatively or cumulatively, at least a part of a power transfer field can be detected by the compensation coil means. Then, the compensation coil means can generate an output signal, e.g. an output voltage as a function of the detected power transfer field. Then, e.g. a proportion of the output signal of the detector coil means which is generated by the power transfer field can be determined as a function of this output signal. This proportion can then be computationally removed from the output signal of the detector coil means. This makes a computer compensation possible. Therefore, the output signal conditioned by the power field is stored and subsequently used for a computer compensation.

This results in an advantageous manner in a precise and complete compensation of the influence of the power transfer field on the detection of interfering bodies.

In another embodiment at least a part of the means for the detection of interfering bodies, preferably the totality of the means for the detection of interfering bodies, in particular the at least one exciter coil means and/or the at least one detector coil means is/are arranged on top of or on an active surface of the primary coil unit or in an active volume of the primary coil unit. Also, the at least one compensation means can be arranged on top of or on the active surface of the primary coil unit or in the active volume of the primary coil unit.

The active surface can designate here a surface of a section of a street surface or of a loading block installed on the street surface through which all or a predetermined amount, e.g., 80%, 90% or 95% of field lines of the power transfer field extend. The active volume can designate here a volume in which all or a predetermined amount, e.g. 80% 90% or 95% of the field lines of the power transfer field run.

The means for the detection of interfering bodies are preferably constructed in the shape of a preferably flat fixture and/or an overlay on top of and/or on the active surface. Flat can mean that a height of the means for the detection of interfering bodies in a first direction which can correspond to a main propagation direction of the power transfer field does not exceed a predetermined height, for example 1 cm, 2.5 cm or 5 cm. The first direction can be a vertical direction herein. The means for the detection of interfering bodies are preferably arranged in the first direction above the primary coil unit, wherein the first direction is oriented from the primary coil unit to a secondary coil unit and therefore from below upward.

In an alternative embodiment at least one part of the means for the detection of interfering bodies, preferably the totality of the means for the detection of interfering bodies, in particular the at least one exciter coil means and/or the at least one detector coil means is/are arranged in the receiving area of a secondary coil unit. A field extending through the receiving area can be received here by the secondary coil unit. The at least one compensation means can also be arranged in the receiving area of the secondary coil unit.

Therefore, the means for the detection of interfering bodies can be constructed to be mobile. In particular the means for the detection of interfering bodies can be arranged on the bottom side on the secondary coil unit, in particular in the first direction below the secondary coil. Even in this instance the means for the detection of interfering bodies can be constructed in the shape of a preferably flat fixture and/or of an overlay.

Of course it is also possible that at least one part of a first means for the detection of interfering bodies on top of or on an active surface of the primary coil unit or in an active volume of the primary coil unit and at least one part of another means for the detection of interfering bodies is arranged in the receiving area of a secondary coil unit.

In particular, a means for the detection of interfering bodies is arranged in such a manner that given a predetermined relative positioning in particular in a loading position explained in detail in the following between the primary coil unit and the secondary coil unit it is arranged between the two coil units. In the previously determined positioning, the primary coil unit and secondary coil unit have a relative position and/or orientation relative to one another such that a desired inductive energy transfer is possible.

Therefore, it is possible to provide means for the detection of interfering bodies designed in accordance with the invention on top of or on the primary coil unit (e.g. the associated active surface) as well as attaching the means for the detection of interfering bodies designed in accordance with the invention on the vehicle side, e.g. underneath the vehicle-side coil unit in the direction of the stationary coupling partner, wherein each of these variants has the result that given a relative position between the primary coil unit and the vehicle-side coil unit that are aligned with one another the means for the detection of interference bodies is arranged between these coil units. This basically makes it possible and is comprised by the invention to provide means for the detection of interference bodies in accordance with the invention on both partners of the inductive coupling.

Furthermore, it is within the scope of the invention to vary a concrete physical placement site of the means for the detection of interfering bodies in regard to a desired detector behavior. Therefore, it can be appropriate in the scope of additional further developments of the invention to provide the means for the detection of interfering bodies deigned in accordance with the invention, for example on the vehicle side and in the direction of travel in front of the (vehicle-side) coil means in such a manner that a detection of interfering bodies to be brought about in accordance with the invention takes place before the actual inductive coupling for the transfer of power takes place by reaching the relative position aligned with one another. The operational safety in the realizing of the invention can also be further improved in this manner.

In another embodiment the at least one exciter coil means and the at least one detector coil means are realized on a carrier which is designed as a circuit board in the form of planar inductivities. The compensation means designed as compensation coil means can also be realized on the carrier in the form of a planar inductivity. The carrier can preferably be designed as a common circuit board, wherein all coil means are arranged on or in the circuit board.

A planar inductivity can be constructed, e.g., by one or more conductor loops extending substantially or exactly in one plane.

This results in a construction of the means for the detection of interfering bodies which is especially simple to manufacture technically and can be readily reproduced, wherein the exciter coil means as well as the detector coil means are constructed on a circuit board (which is otherwise to be presupposed as known). To this end the coils and the associated windings can be appropriately designed as planar windings by appropriately sampling the circuit board. It is additionally possible as a further development to provide the particular planar windings on different end surfaces and/or conducting track layers of a printed circuit board arrangement in the manner of a double or multilayer printed circuit board in order to be able to separately contact in a suitable manner a preferred plurality of individual coils of the means for the detection of coils to be provided and additionally also to contact and to be able to separately evaluate the exciter coil means and optionally other additional compensation coil means for a coil field of the primary coil unit which coil field is to be compensated. In a supplementary or alternative manner complex contactings can also take place with the aid of otherwise known as feedthroughs or similar measures.

Therefore, different planar windings can be arranged on different levels of the circuit board, e.g. on a surface or on inner conductor track layers.

In another embodiment the at least one exciter coil means and the at least one detector coil means are designed as planar inductivities on different conductor layers and/or on flat sides of the common circuit board which face one another.

In another embodiment the at least one detector coil means is designed as a plurality of individual coils adjacent to each other on a circuit board surface. A detector coil means can be constructed here by an individual coil. The individual coils can be arranged here adjacent to each other with a predetermined grouping, in particular a two-dimensional grouping or a predetermined matrix arrangement. Adjacent can mean that the individual coils do not overlap.

Alternatively or cumulatively, the at least one detector coil means is designed as a plurality of individual coils arranged at least partially overlapping each other.

The fact that the at least one detector coil means is designed as a plurality of individual coils also comprises the instance that several detector coil means each designed as an individual coil are provided.

The individual coils of the detector coil means, which are advantageously provided in a plurality, can therefore be provided in a two-dimensional grouping or in a matrix form. This further development of the invention, which can also provide alternatively or cumulatively a (partial) overlapping of individual coils adjacent to each other is especially favorably suited for covering or electromagnetically mastering a flat field in a defined manner. A two-dimensional arrangement of a plurality of detector coils, more preferably surrounded by one or more exciter coils, results in a magnetic field of the electromagnetic coupling which is flat or surface-covering in accordance with the course of the surface of the active surface to be detected. At the same time an undesired production of disturbance fields or stray fields outside of the geometry of the active surface is largely prevented.

In another embodiment the at least one exciter coil means is designed as a coil, in particular as an individual coil or conductor coil, which coil surrounds or comprises the detector coil means at least in sections on the edge.

Of course it is also possible that the exciter coil means is designed as a plurality of individual coils. An exciter coil means can be constructed here by an individual coil. The fact that the at least one exciter coil means is constructed as a plurality of individual coils also comprises the instance that several exciter coil means each constructed as an individual coil are provided.

Surrounding can mean here that the detector means is arranged in the area surrounded by the exciter coil means, in particular in the area surrounded by the individual coil or coils in a common projection plane which can be oriented parallel to the surface surrounded by the exciter coil means. It is possible that the exciter coil means completely or only partially surround or comprise all detector coil means.

If the exciter coil means is constructed by several individual coils, e.g. by individual coils constructed by conductor loops, then individual coils can be arranged adjacent to each other.

For example, an individual coil can comprise exactly one or exactly a predetermined number of detector coil means, in particular detector coil means also constructed as individual coil means. Alternatively, an individual coil can comprise only a predetermined amount, for example, one half or one third of one or of each of a predetermined number of detector coil means.

Furthermore, each of all individual coils can surround an equally large number of detector coil means (symmetrical surrounding). Alternatively, all or individual coils can comprise portions of the detector coil means with sizes differing from each other (asymmetric surrounding).

Therefore, it is possible that the exciter coil means, in particular an individual coil, does not completely surround a detector coil means or that the exciter coil means completely surrounds selected but not all detector coil means.

In another embodiment the at least one compensation coil means is arranged on or in the circuit board. The compensation coil means can be constructed here as an individual coil or as a plurality of individual coils. A compensation coil means can be constructed here by an individual coil.

In particular, the compensation coil means can be constructed separately from the exciter coil means and the detector coil means. Furthermore, the compensation coil means can be separately contacted by an evaluation means. The compensation coil means is preferably arranged in such a manner that that the electromagnetic coupling state between the at least one exciter coil means and the at least one detector coil means is not influenced by the compensation coil means.

In another embodiment means for generating exciter signals which is connected by signaling technology to the exciter coil means generates an exciter signal with one or several exciter frequencies and/or with an excitation frequency spectrum in the frequency range of 1 kHz to 5 MHz, in particular in a frequency range of 1 kHz to 500 kHz. The means for generating exciter signals can be connected in particular in front of the exciter coil means.

A detection of an interfering body that rests on the active surface or is electromagnetically coupled in an undesirable manner to the active surface can take place in that the evaluation means, which is connected, in particular connected in downstream, by signaling technology to the detector coil means, evaluate an output signal of the detector coil means. The evaluation can take place, e.g., with reference made to the exciter coil means, in particular on the exciter signal. For example, the determination can take place in the manner of a difference transformer (that is otherwise to be presumed is known) as to what extent the interfering body (to be detected) affects the coupling between the exciter coil means and the detector coil means.

In the disturbance-free ideal case these coil means can be uncoupled or coupling-free relative to each other. This can be achieved, e.g. by suitably designing the physical geometries and/or the arrangement of the exciter coil means and/or of the detector coil means on the coil carrier.

Alternatively or cumulatively, this state of the disturbance-free coupling (or decoupling) can take place by a suitable computer or digital difference formation of the signal processing carried out in the evaluation means.

A detection can also be based on the fact that a change of the coupling behavior between the exciter coil means and the detector coil means by the interfering body is detected and evaluated.

The providing of coil means on the transmitting side and/or the receiving side which is decided and provided separately only for the purpose of detection makes possible not only significant advantages in the sensitivity of the detection (as concerns signal-noise intervals suitable for detection). It is also possible to carry out a detection and/or evaluation of a class, type or of a size of a particular interfering body. Therefore, an interfering body can be, e.g. characterized. In particular, e.g. a type of material and/or a size of the interfering body can also be determined.

Therefore, the invention can advantageously make possible the start or introduction of reaction measures as a function of the type and/or size of a particular interfering body.

This can take place, e.g. in that the signaling-technology connection between the exciter signal generated for the exciter coil means and between the output signal generated by the detector coil means is evaluated with regard to one or more signal parameters.

In particular, different interfering bodies can influence the signaling-technology connection on one or more frequencies or in a frequency range, in particular as a function of the size and/or position and/or type of material. This dependency on frequency can then be evaluated in a purposeful manner.

A broadband signal evaluation or one aligned on several spectrally different frequencies can be advantageous here. In this manner an effective compensation of the power transfer field generated by the primary coil unit in its operation of transfer or charging can also be achieved.

In particular, a broadband or frequency-selective exciter signal can be generated, wherein a typical frequency spectrum of the exciter signal is in the range between approximately 10 and approximately 500 kHz. However, in particular the exciter signal can not contain any frequencies in a predetermined excitation frequency range that contains a frequency of the exciter signal of the primary coil unit. It is therefore, e.g. possible that the exciter signal contains only one frequency or several frequencies or one or more frequency range(s) below a minimal frequency of the excitation frequency range and/or above a maximum frequency of the excitation frequency range. The excitation frequency range can contain, for example, the excitation frequency of the primary coil unit as center frequency and have a predetermined minimum magnitude, e.g. 20 kHz.

A spectral range of an excitation signal of the operated primary coil unit, which can generate an interference field as regards the detection, can be, e.g. in the range of customarily approximately 140 kHz so that a reliable evaluation of the output signal for a detection of an interfering body is possible by a spectral evaluation above as well as below such a (interfering) spectrum without a (powerful) signal of the primary coil unit making a sensitive and high-resolution detection of interfering bodies difficult.

To this extent such a broadband or frequency-selected carrying out of the detection by the compensation means realizes an effective fade-out of a primary field present in the inductive energy transfer operation so that interfering bodies the size of a coin or smaller can be reliably detected in typical active-surface sizes in the range between approximately 0.5 square meter and 5 square meter.

In another embodiment the exciter signal is generated with a plurality of excitation frequencies which are spectrally separated from each other. A minimum and a maximum excitation frequency can be spectrally separated from each other by at least 100 kHz, preferably by at least 200 kHz, more preferably by at least 300 kHz. Frequencies of the individual excitation signals can for their part be separated by predetermined frequency intervals, e.g. 10 kHz, 20 kHz or 50 kHz.

Alternatively or cumulatively, the exciter signal is generated in a spectrally at least 100 kHz wide, preferably in a spectrally at least 200 kHz wide, more preferably in a spectrally at least 300 kHz wide, excitation frequency range.

In another embodiment the evaluation means for detecting and evaluating an output signal of the detector coil means is designed in such a manner that the output signal can be evaluated spectrally over a frequency range of at least 100 kHz and/or for a plurality of excitation frequencies spectrally separated from each other, e.g. for the previously explained excitation frequencies. The output can also be designated here as a detector signal.

In another embodiment the at least one evaluation means is designed to detect and evaluate a frequency and/or a phase and/or an amplitude of an output signal of the detector coil means. In particular, the evaluation means are designed to detect and evaluate a frequency change and/or phase change and/or amplitude change of the output signal of the detector coil means. The frequency change and/or phase change and/or amplitude change can be a change in time here. The frequency change and/or phase change and/or amplitude change is preferably a change relative to a reference signal.

The reference signal can be in particular an output signal of the detector coil means which is generated under the same excitation conditions, in particular upon the reception of the same excitation field if no interfering body is present. Alternatively, the reference signal can be the exciter signal. Alternatively or cumulatively, the reference signal can be an output signal of another detector coil means.

A combined frequency change and/or phase change and/or amplitude change of the detector signal can preferably be evaluated.

Therefore, the occurrence of amplitudes, frequency differences or phase differences, e.g. between the exciter signal and the output signal can be evaluated as a reaction to an interfering body. The determination of frequency and/or phase and/or amplitude or their change also makes it possible to additionally characterize an interfering body in its material properties, its position or positioning on the active surface and its possible spatial orientation and its size.

It turned out, e.g. that a phase shift to be evaluated by the evaluation means and/or a change in amplitude makes it to possible to determine a geometry of an interfering body. A frequency or frequency change, in particular a difference signal, makes it possible to determine a penetration depth, as a result of which material properties of the interfering body can be determined.

In particular, a predetermined surface, e.g. the active surface or a part of the active surface or a surface completely containing the active surface can be covered, e.g. with the previously described arrangement of the plurality of detector coil means. A predetermined surface in the receiving area of a secondary coil unit can also be covered, e.g. a receiving surface or a part of the receiving surface or a surface completely containing the receiving surface, wherein the receiving surface can be a cross-sectional surface of the receiving area in a cross-sectional plane to the previously explained first direction.

In the case of a plurality of detector coil means several output signals can then be selectively evaluated (according to a particular individual detector coil). The complex signal pattern which is therefore produced can then be evaluated as regards properties of interfering bodies and also its localization on or in the active surface. Furthermore, correspondingly appropriate auxiliary reactions can be initiated, e.g. an automatic cleaning of the active surface.

In another embodiment at least one compensation means is provided which is designed to take into account an electromagnetic influence of the vehicle on the coupling state between the at least one exciter coil means and the at least one detector coil means.

The compensation means can correspond here to the previously explained compensation means or can be constructed as an additional, e.g. separate compensation means. The compensation means is preferably provided on or in a circuit board provided for the exciter coil means and the detector coil means. It is furthermore preferred that the compensation means is realized at least partially by the evaluation means. The electromagnetic influence of the vehicle on the coupling state between the at least one exciter coil means and the at least one detector coil means can be determined and/or reduced, in particular completely compensated or eliminated by the compensation means for taking account of an electromagnetic influence of the vehicle. The previous comments regarding the active compensation and the computer compensation accordingly apply here.

Therefore, the invention makes it possible on the one hand to take account of, in particular to minimize an influence of the power transfer field on the coupling state between the at least one exciter coil means and the at least one detector coil means. This comprises the taking account of an electromagnetic influence of the primary coil unit as well as of the secondary coil unit.

This can take place, e.g. by the previously explained generation of a broadband and/or frequency-selective exciter signal and a corresponding evaluation of the output signal. The compensation means can be realized here appropriately by suitably designing the evaluation means.

The in particular additional compensation means for taking account of an electromagnetic influence of the vehicle advantageously additionally allows the taking account of an element influence of the vehicle itself (by the corresponding, electromagnetically relevant vehicle masses). Therefore, this can also be designated as a vehicle compensation means.

E.g., one or more special additional coil(s) can be provided for the purpose of the supplementary or alternative compensation of the electromagnetic influence of the vehicle. They can be constructed separately from the previously explained compensation coil means. The additional coil(s) can, however, also be made available by the previously explained compensation coil means.

The at least one additional detector coil can be provided geometrically adjacently on a common circuit board with coils of the exciter coil means and/or of the detector coil means. Alternatively, the at least one additional detector coil can, however, also be able to be taken into consideration in another way geometrically, constructively and/or by computer. The boundary conditions of a particular usage then give the setting here for the best possible effective compensation (or compensation requirements), wherein in the scope of the invention not only exclusively the compensation of an influence of the primary coil unit is then to be ensured.

As a result the invention allows a system for the detection of interfering bodies to be provided in a surprisingly simple and effective manner which combines a very high degree of flexibility in use with maintenance friendliness, replaceability and operational safety ideally in the manner of a fixture or a similar module for connection to one of the performance partners (i.e., the primary coil unit and/or the vehicle-side coil unit). Accordingly, it is to be expected that as a result of the technology in accordance with the invention the spectra of usage and of the application of the inductive transfer of energy, in particular also in the performance range, will be significantly expanded and to this extent additional usage will be created while solving the initially cited problems.

Furthermore, a system for the inductive transfer of energy is proposed wherein the system comprises at least one primary coil unit for generating at least a part of an electromagnetic power transfer field and a secondary coil unit for receiving the electromagnetic field generated by the primary coil unit.

According to the invention the system comprises a device for the detection of a foreign object according to one of the previously explained embodiments.

Furthermore, an inductive active surface and/or an inductive active volume can be associated with the primary coil unit, wherein the device for the detection is constructed and/or arranged in such a manner that a foreign object arranged on the active surface or in the active volume or a foreign object adjacently arranged that is field-active concerning the active surface or the active volume can be detected. The active surface and the active volume have already been previously explained. In particular, the previously explained circuit board can be arranged on the active surface or in the active volume. In particular, the circuit board can cover a part or the entire active surface. It is also possible that the circuit board covers a surface which completely encloses the active surface.

The secondary coil unit can be placed in a position relative to the active surface in such a manner that an inductive coupling between the primary coil unit and the secondary coil unit can bring about a power transfer, e.g. in order to charge a vehicle battery or traction battery. This relative position can also be designated as a charging position.

The power transfer can be prevented and/or deactivated as a function of and/or influenced by an operation of the means for the detection of interfering bodies. E.g., a power transfer can be prevented and/or deactivated if an interfering body was detected.

Furthermore, the means for the detection of interfering bodies can be provided in such a manner between the primary coil unit and a secondary coil unit positioned in the charging position that the detection of the interfering body, in particular on the active surface, is made possible before the vehicle reaches the charging position and/or is in the charging position. The charging position designates here a relative position and/or relative orientation in which a power transfer, in particular with predetermined properties, is possible between the primary coil unit and the secondary coil unit.

A method for the detection of at least one interfering body in a system for the inductive transfer of energy is furthermore proposed, wherein the system for the inductive transfer of energy comprises at least one primary coil unit for generating at least a part of an electromagnetic power transfer field, wherein an exciter field is generated by at least one exciter coil means of a means for the detection of interfering bodies and is at least partially received by at least one detector coil means of the means for the detection of interfering bodies which is associated with the at least one exciter coil means, wherein a coupling state between the at least one exciter coil means and the at least one detector coil means and/or a change of the coupling state is detected, wherein the foreign object is detected as a function of the coupling state and/or of the change of the coupling state.

Furthermore, an electromagnetic influence of the primary coil unit and/or secondary coil unit on the coupling state between the at least one exciter coil means and the at least one detector coil means is taken into account or compensated, in particular minimized, preferably completely compensated or eliminated by at least one compensation means.

The method can be carried out preferably by a device according to one of the previously explained embodiments or by one of the embodiments described in this invention. Furthermore, all methods are therefore also described which can be carried out by a device according to one of the previous embodiments.

In particular, the at least one means for the detection of interfering bodies is constructed separately from the primary coil unit. Moreover, the amount of the power transfer field on the field received by the at least one detector coil means is reduced by the compensation means. Alternatively or cumulatively the amount of the output signal generated by the at least one detector coil means as a function of the received power transfer field is reduced by the compensation means.

E.g., the previously explained compensation field can be generated by the compensation means. Also, at least one property of an output signal of the at least one detector coil means can be evaluated, in particular the previously explained amplitude and/or frequency and/or phase of their changes, which have also been previously described.

Furthermore, a material type of the foreign body and/or a size of the foreign body and/or a position of the foreign body relative to the means for the detection of interfering bodies can additionally be determined.

Furthermore, a power transfer can be prevented and/or deactivated and/or attenuated if an interfering body was detected.

BRIEF DESCRIPTION OF THE DRAWINGS

Other advantages, features and details of the invention result from the following description of preferred exemplary embodiments and from the drawings; in which.

DETAILED DESCRIPTION OF THE INVENTION

Figure 1:
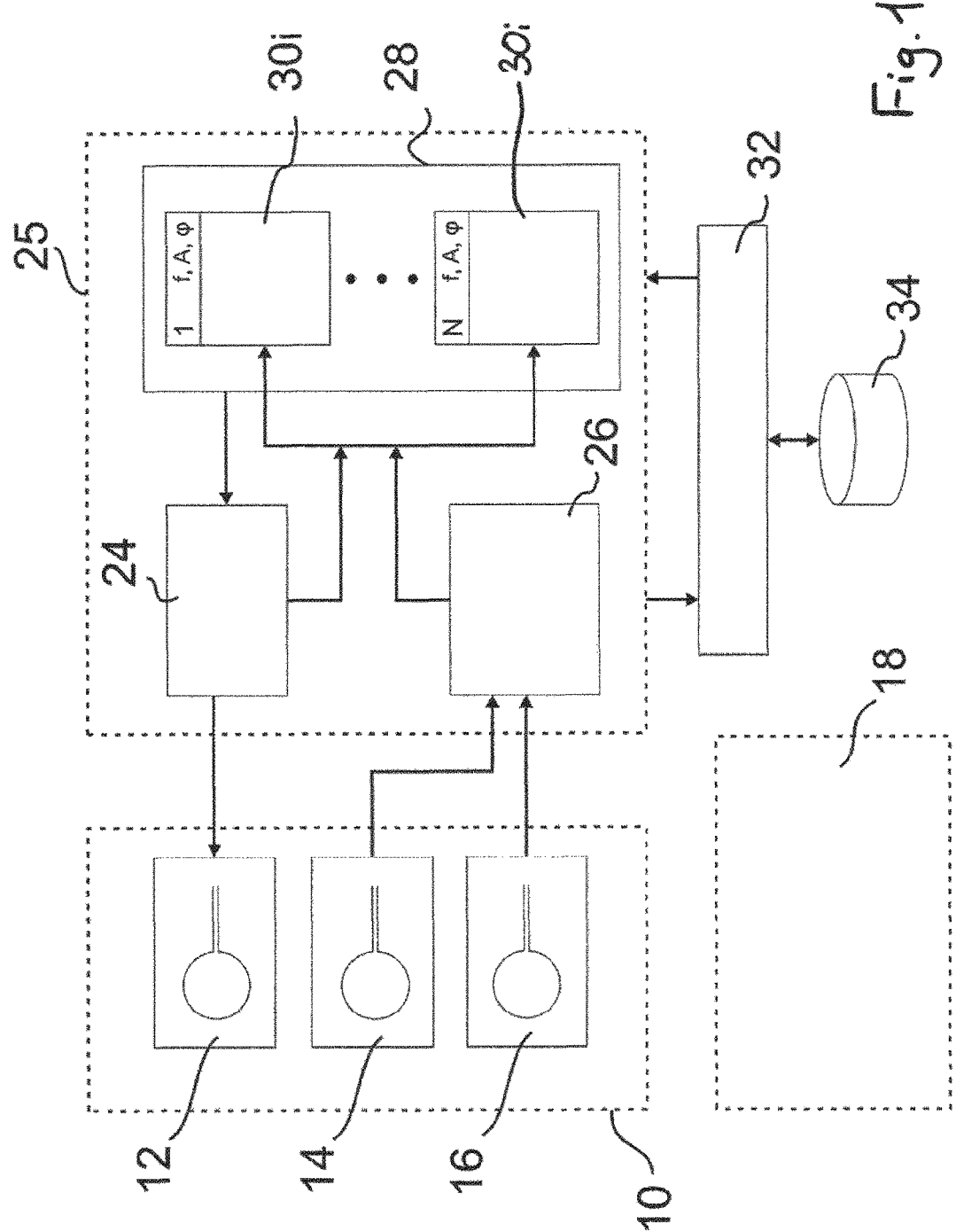
FIG. 1 shows a schematic block diagram of the device according to the invention for the inductive transfer of energy with means for the detection of interfering bodies according to a preferred embodiment of the invention.

FIG. 1 shows in the schematic block diagram the construction and the cooperation of the essential functional components which realize the means for the detection of interfering bodies according to the invention in the framework of the device for the inductive transfer of energy according to a first exemplary embodiment of the invention.

Figure 2:
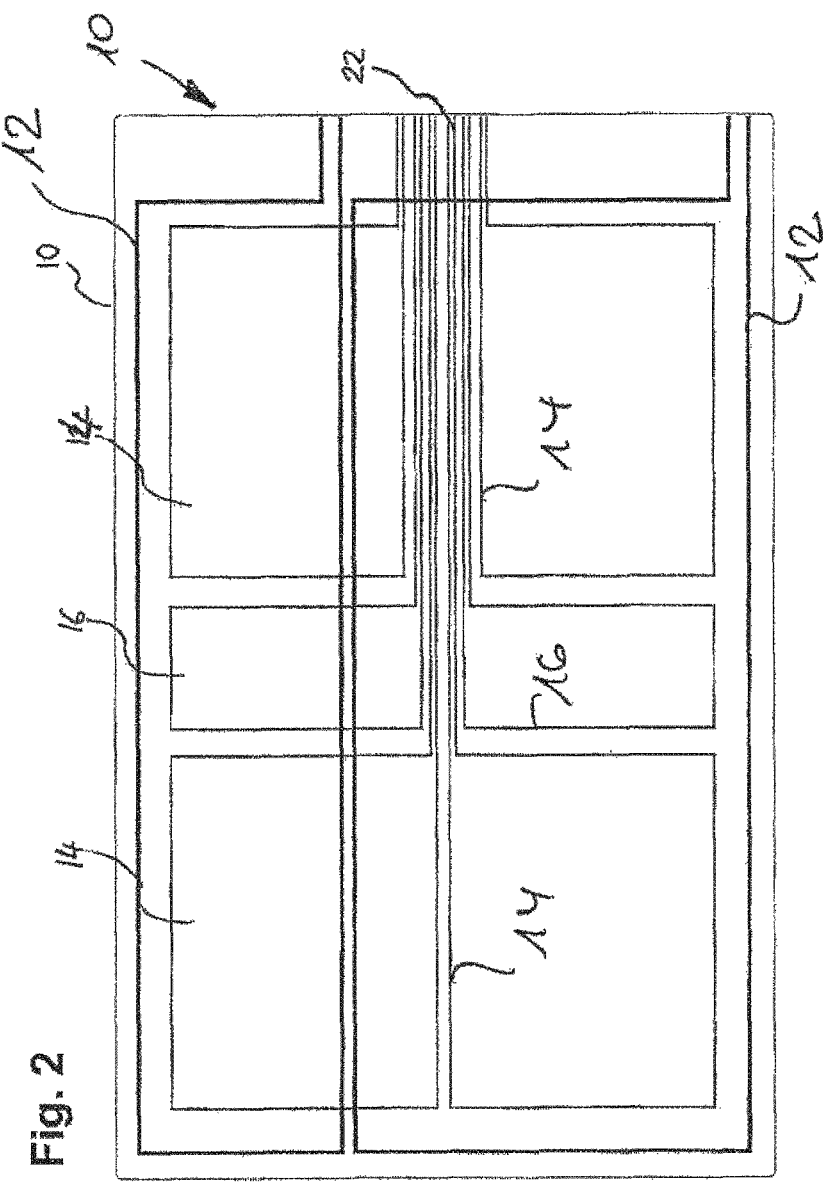
FIG. 2 shows a schematic top view onto a possible coil layout of the carrier plate for exciter coil means and detector coil means jointly provided on it along with additional compensation coil means and FIG. 3 shows a schematic view for illustrating the use of the present invention in an exemplary system for the electrical transfer of energy to a vehicle.

Concretely speaking, the exciter coil means 12 in the form of two large, circumferential conductor loops are realized on a carrier unit 10 constructed as a printed circuit board, cf. for the details the top view onto the printed circuit board according to FIG. 2. The exciter coil means 12 surrounds four detector coils arranged in a 2×2 matrix arrangement as detector coil means 14. Therefore, two detector coil means 14 are each arranged in a series. In one series additional compensation means 16 for the compensation of a power transfer field and constructed as compensation coils are arranged between the pair of detector coil means 14. Therefore, a magnetic field influence of a primary coil unit 18 used for the transfer of energy or of a secondary coil unit 38 and the influence of electromagnetic materials of a vehicle itself (reference numeral 20 in FIG. 3) can be reduced, preferably eliminated.

It is shown here that a first exciter coil means 12 comprises or covers only a part of the detector coil means 14 in a first series, in particular approximately half of the detector coil means 14 in the first series. Another exciter coil means 12 comprises the remaining parts of the detector coil means 14 in the first series and completely comprises or covers the detector coil means 14 in another series. Of course, however, other arrangements are conceivable.

As the schematic view of the printed circuit board layout FIG. 2 illustrates, in order to avoid short circuits or overlappings and in order to simplify an ability to make contact with each individual coil or coil winding the exciter coil means 12 are arranged on a flat side of the printed circuit board 10 and the detector coil means 14 and compensation coil means 16 on the opposite side and can accordingly be contacted on an edge-side connection area 22.

As the block diagram of FIG. 1 illustrates, a signal loading of the exciter coil means 12 takes place by a signal generation unit 24 which is constructed for generating a broadband exciter signal in the frequency range between approximately 10 kHz and approximately 500 kHz; in the concrete exemplary embodiment individual frequency signals are generated at the frequencies 100 kHz, 120 kHz, 180 kHz, 200 kHz and 250 kHz spaced in each instance by a maximum of 100 kHz in the frequency spectrum. Therefore, a corresponding exciter field is generated.

On the receiving side the detector coil means 14 and the compensation coil means 16 are connected to a signal detection- and preparation unit 26 realized in the framework of electronic evaluation means 25. This functional component detects in an otherwise known manner a signal (likewise broadband) induced in the detector coil means and compensation means 14, 16 by the exciter field, wherein the induced signal can also be designated as output signal. The output signal can be suitably amplified and digitized in order to further process it in a signal processing unit 28 connected in downstream. The signal processing unit 28 is likewise connected for purposes of analysis and comparison by signaling technology to the signal generation unit 24, wherein the exciter signal can also be transferred from the signal generation unit to the signal processing unit 28.

A comparison or analysis of the signal obtained from the signal detection- and preparation unit 26 (which is then typically digitally present) now takes place in the signal processing unit 28, namely in the framework of the shown, preferred embodiment for each of the four detector coil units 14. To this extent the analysis functionality 30$i$ schematically shown in the signal processing unit 28 can be designed for i=1 to N=4.

It was determined in the signal analysis whether an output signal of a particular detector coil 14 has in frequency (f), amplitude (A) and phase ($\varphi$) a deviation from the exciter signal of the signal generation unit 24 which was used as driver signal for the exciter coil means 12.

In addition, a signal comparison takes place with a reference data record from a reference unit 32 which contains stored reference data of a storage unit 34. This reference data is the result of a setup- or calibration procedure of the device under defined operating conditions, in particular a calibration operating state free of interfering bodies.

Figure 3:
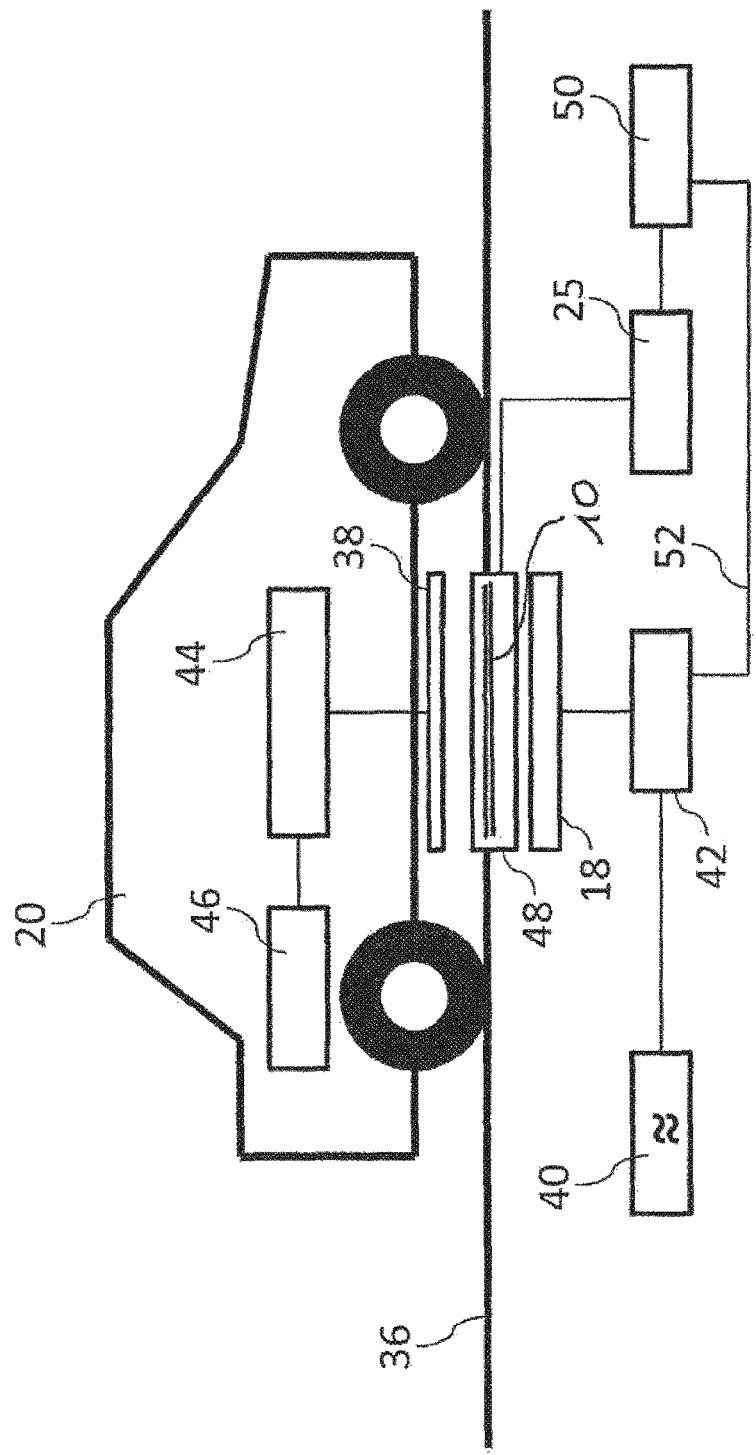

FIG. 3 illustrates the operating and usage context of the invention. The vehicle 20, which can move on a schematically shown road surface 36 comprises a secondary coil unit 38 in the bottom area and directed toward the road surface which unit is designed in an otherwise known manner for a contactless, inductive cooperation with a stationary primary coil unit 18. Electrical energy obtained from a voltage supply unit 40 is prepared in a known manner by a control-power unit 42 for coupling into the primary-side coil unit 18.

In the loading position of the vehicle 20 shown in FIG. 3 the secondary coil unit 38 is standing at a typical distance between approximately 10 and 20 cm opposite the primary coil unit 18 in an aligned manner. Therefore, the contactless, electrical-inductive transfer of energy can be brought about in an otherwise known manner. Energy appropriately coupled electromagnetically and inductively into the secondary coil unit 38 is prepared for its part via the suitable charging electronics 44 and supplied to the vehicle energy storage unit 46 for charging purposes in an otherwise known manner.

The means for the detection of interfering bodies provided in accordance with the invention are in the form of a fixture 48 realized on the primary-side coil unit 18, wherein the fixture 48 in the manner of a module or with the shape of a flat box comprises or contains the carrier unit 10 shown in FIG. 2 in detail for the coil arrangements shown. The fixture 48 can then cover as much as possible of an active surface of the primary coil unit 18 in the manner shown. The active surface can be, e.g. an upper surface of the primary coil unit 18.

Evaluation means 25 is connected in downstream from the module unit 48 (see FIG. 1 for details), wherein the evaluation means 25 carries out in the manner shown the signal generation unit 24 for the exciter coil means 12 as well as the detector-side signal preparation and signal processing.

A reaction and alarm unit 50 is connected in downstream from the evaluation means 25 which initiates or causes a technical reaction as a reaction to a detection signal of the evaluation means 25 (namely, that an interfering body is resting on the fixture 48 in a manner to be detected), for example by submitting a suitable signal or alarm supplemented or alternatively by the initiation of suitable removal or cleaning measures. A schematically shown connection 52 to the power control unit 42 can additionally bring it about that upon detection of the interfering body (another) electrical power charge into the primary-side coil unit 18 is prevented so that dangers can be effectively avoided.

The operation of the device described for FIGS. 1 and 2 and shown in the context of FIG. 3 is as follows:

The vehicle 20 to be supplied by the inductive coupling of the units 18, 38 with charging current for the battery unit 46 is brought into the charging position shown in FIG. 3 above the primary coil unit 18. Prior to this positioning a monitoring takes place by an (ideally permanent) operation of the means for the detection of interfering bodies 48, 25, 50 whether an electromagnetically relevant and/or potentially dangerous interfering body is present on the fixture 48 and to this extent also above the active surface.

This takes place technically in the operation of the units 10, 25 in that an electromagnetic coupling brought about between the coil means 12, 14 in the control state by the signal generation unit 24 is checked for changes of the coupling-relevant output signal by the evaluation-side units 26, 28, 30$i$.

Concretely speaking, in the present case an adjustment of the detector-side signals can take place as regards a change of the frequency, amplitude and of the phase compared to the exciter signal and also relative to a stored reference signal. When a suitable threshold value which then describes an interfering body state is exceeded, a corresponding interfering state or alarm state is signalized by the unit 50 and further measures are initiated.

The present invention is not limited to the exemplary embodiment shown but rather the design of the carrier unit 10 described by way of example with the particular detector coil means can be variably and freely adapted to any situations of use such as a number and an arrangement of individual coils to be provided as well as their evaluation and arrangement on the primary-side coil unit.

Therefore, it is also possible in the scope of alternative embodiments of the invention to design the coil carrier unit completely covering the surface of the primary coil unit 18 by way of example as covering only part of the surface and alternatively to also arrange this coil carrier unit on the vehicle, in particular on its bottom entirely or partially covering the secondary coil unit 38.

On the other hand, as an alternative the coil carrier unit can also be provided, e.g. in the direction of travel in front of the secondary coil unit 38 in order to already perform a detection before an electromagnetically relevant coupling state and engagement state for the transfer of power takes place at all.

There are also other possibilities on the evaluation side for further developing and/or varying the invention. Therefore, it proved to be advantageous, for example, in the framework of the invention as a further development that the measured and matched signal parameters, including a variation of frequency, amplitude and/or phase, of the signal change caused by the interfering body are characteristic for the type and/or the material, size, position and similar properties of the interfering body.

Accordingly, it is in the scope of further developments (not shown in the figures) of the invention to associate suitable characterizing means for interfering bodies with evaluation means or with the signal analysis means 30i or to connect these characterizing means for interfering bodies in downstream from evaluation means or from the signal analysis means 30i which characterizing means perform a characterization of the interfering body based on the detected signal changes and specifically initiate a suitable removal measure based on this characterization (for example, therefore, the determination that the interfering body is a sheet-shaped interfering body).

As a result, the present invention brings it about in a surprisingly simple and elegant manner that the operating safety can be significantly raised particularly also in the technical area of the high-performance transfer of energy between inductively coupled coil partners. The present invention not only allows the simple realizing and retrofitting of existing systems that is favorable from a technical manufacturing standpoint but the present invention also achieves a distinct improvement of efficiency regarding the electrical consumption of energy since now and in contrast to the generic, presupposed prior art a continuous monitoring of interfering bodies can take place with a low usage of electric power (namely, only for the means for the detection of interfering bodies and the units separately provided to this end without, for example, the power coil units having to be supplied with current.

The invention claimed is:

1. A device for the detection of at least one interfering body in a system for the inductive transfer of energy, wherein the system for the inductive transfer of energy comprises at least one primary coil unit for generating at least a part of an electromagnetic power transfer field, the device comprising:
   at least one detector for the detection of interfering bodies,
   wherein the at least one detector for the detection of interfering bodies comprises at least one exciter coil for generating an exciter field and at least one detector coil which is associated with the at least one exciter coil;
   at least one electronic evaluator for detecting a coupling state between the at least one exciter coil and the at least one detector coil and/or for detecting a change of the coupling state,
   wherein the interfering body is detectable as a function of the coupling state and/or of the change of the coupling state; and
   at least one compensator for compensating an electromagnetic influence of the primary coil unit and/or of a secondary coil unit on the coupling state between the at least one exciter coil and the at least one detector coil,
   wherein the at least one detector for the detection of interfering bodies is constructed separately from the primary coil unit,
   wherein a proportion of the power transfer field in the field received by the at least one detector coil is reducible by the at least one compensator and/or a proportion of the output signal which is generated by the at least one detector coil as a function of the received power transfer field is reducible by the compensator,
   wherein the at least one compensator comprises at least one compensation coil, wherein a compensation field is generatable by the compensation coil, and
   wherein at least a part of the power transfer field received by the at least one detector for the detection of interfering bodies is compensatable by the compensation field, and/or wherein at least a part of the power transfer field is detectable by the compensation coil.

2. The device according to claim 1, wherein at least a part of the detector for the detection of interfering bodies is arranged on or on an active surface of the primary coil unit and/or in an active volume of the primary coil unit.

3. The device according to claim 1, wherein at least a part of the detector for the detection of interfering bodies is arranged in the receiving range of the secondary coil unit.

4. The device according to claim 1, wherein the at least one exciter coil and the at least one detector coil are realized on a carrier constructed as a circuit board in the form of planar inductivities.

5. The device according to claim 4, wherein the at least one exciter coil and the at least one detector coil are constructed as planar inductivities on different conductor layers and/or on facing flat sides of the circuit board.

6. The device according to claim 4, wherein the at least one detector coil is constructed as a plurality of individual coils adjacent to each other on a surface of the circuit board and/or as a plurality of individual coils arranged at least partially overlapping each other.

7. The device according to claim 1, wherein the at least one exciter coil is constructed as a coil surrounding the detector coil at least in sections on the edge.

8. The device according to claim 4, wherein at least one compensation coil is arranged on or in the circuit board.

9. The device according to claim 1, wherein an exciter signal with one or more excitation frequencies and/or an excitation frequency spectrum in the frequency range of 1 kHz to 5 MHz is generated by an exciter signal generator connected to the at least one exciter coil by signaling technology.

10. The device according to claim 9, wherein the exciter signal is generated with a plurality of excitation frequencies spectrally separated from each other and/or in an excitation frequency range which is spectrally at least 100 kHz wide.

11. The device according to claim 1, wherein the at least one electronic evaluator is designed to detect and evaluate an output signal of the at least one detector coil spectrally over a frequency range of at least 100 kHz and/or for a plurality of carrier frequencies which are spectrally separated from each other.

12. The device according to claim 1, wherein the electronic evaluator is designed to detect and evaluate a frequency and/or phases and/or an amplitude of an output signal of the detector coil.

13. The device according to claim 1, wherein the at least one compensator is/are designed to compensate an electromagnetic influence of a vehicle on the coupling state between the at least one exciter coil and the at least one detector coil.

14. A system for the inductive transfer of energy, comprising at least one primary coil unit for generating at least a part of an electromagnetic power transfer field, a secondary coil unit for receiving the electromagnetic field generated by the primary coil unit and a device for the detection of an interfering body, wherein the device comprises:
   at least one detector for the detection of interfering bodies,
   wherein the at least one detector for the detection of interfering bodies comprises at least one exciter coil for generating an exciter field and at least one detector coil which is associated with the at least one exciter coil,
   wherein the device comprises at least one electronic evaluator for detecting a coupling state between the at least one exciter coil and the at least one detector coil and/or for detecting a change of the coupling state, wherein the interfering body is detectable as a function of the coupling state and/or of the change of the coupling state, wherein the device comprises at least one compensator for compensating an electromagnetic influence of the primary coil unit and/or of a secondary coil unit on the coupling state between the at least one exciter coil and the at least one detector coil, wherein the at least one detector for the detection of interfering bodies is constructed separately from the primary coil unit, wherein a proportion of the power transfer field in the field received by the at least one detector coil is reducible by the compensator and/or the proportion of the output signal which is generated by the at least one detector coil as a function of the received power transfer field is reducible by the compensator, wherein the at least one compensator comprises at least one compensation coil, wherein a compensation field is generatable by the compensation coil, wherein at least a part of the power transfer field received by the at least one detector for the detection of interfering bodies is compensatable by the compensation field, and/or wherein at least a part of the power transfer field is detectable by the compensation coil.

15. A method for the detection of at least one interfering body in a system for the inductive transfer of energy, wherein the system for the inductive transfer of energy comprises at least one primary coil unit for generating at least a part of an electromagnetic power transfer field, the method comprising:

generating an exciter field by at least one exciter coil of a detector for the detection of interfering bodies;

receiving at least partially the exciter field by at least one detector coil of the detector for the detection of interfering bodies which is associated with the at least one exciter coil, detecting a coupling state between the at least one exciter coil and the at least one detector coil and/or a change of the coupling state;

detecting the interfering body as a function of the coupling state and/or of the change of the coupling state, compensating an electromagnetic influence of the primary coil unit and/or of a secondary coil unit on the coupling state between the at least one exciter coil and the at least one detector coil by at least one compensator, and constructing the at least one detector for the detection of interfering bodies separately from the primary coil unit, wherein a proportion of the power transfer field in the field received by the at least one detector coil is reduced by the compensator and/or a proportion of the output signal which is generated by the at least one detector coil as a function of the received power transfer field is reduced by the compensator.

16. The device according to claim 1, wherein the at least one exciter coil and the at least one detector coil are realized on a carrier constructed as a circuit board in the form of planar inductivities, wherein the at least one exciter coil is constructed as a coil surrounding the detector coil at least in sections on the edge.

17. The device according to claim 4, wherein the at least one detector coil is constructed as a plurality of individual coils adjacent to each other on a surface of a circuit board and/or as a plurality of individual coils arranged at least partially overlapping each other, wherein the at least one exciter coil and the at least one detector coil are constructed as planar inductivities on different conductor layers and/or on facing flat sides of the circuit board.

18. The device according to claim 1, wherein the at least one exciter coil and the at least one detector coil are realized on a carrier constructed as a circuit board in the form of planar inductivities, wherein the at least one detector coil is constructed as a plurality of individual coils adjacent to each other on a surface of a circuit board and/or as a plurality of individual coils arranged at least partially overlapping each other, wherein the at least one exciter coil and the at least one detector coil are constructed as planar inductivities on different conductor layers and/or on facing flat sides of the circuit board, wherein the at least one exciter coil is constructed as a coil surrounding the detector coil at least in sections on the edge.

19. The system according to claim 14, wherein the at least one exciter coil and the at least one detector coil are realized on a carrier constructed as a circuit board in the form of planar inductivities, wherein at least one compensation coil is arranged on or in the circuit board.

* * * * *